US012748745B2

(12) United States Patent
Narita et al.

(10) Patent No.: US 12,748,745 B2
(45) Date of Patent: Sep. 29, 2026

(54) INFORMATION PROCESSING DEVICE

(71) Applicant: NTN Corporation, Osaka (JP)

(72) Inventors: Takeshi Narita, Iwata (JP); Naoki Marui, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 18/994,795

(22) PCT Filed: Jul. 19, 2023

(86) PCT No.: PCT/JP2023/026367
§ 371 (c)(1),
(2) Date: Jan. 15, 2025

(87) PCT Pub. No.: WO2024/034338
PCT Pub. Date: Feb. 15, 2024

(65) Prior Publication Data

US 2026/0037496 A1 Feb. 5, 2026

(30) Foreign Application Priority Data

Aug. 8, 2022 (JP) ................................. 2022-126508
Jan. 13, 2023 (JP) ................................. 2023-003909

(51) Int. Cl.
*G06F 16/00* (2019.01)
*G06F 16/22* (2019.01)
*G06F 16/2455* (2019.01)

(52) U.S. Cl.
CPC ...... *G06F 16/2272* (2019.01); *G06F 16/2455* (2019.01)

(58) Field of Classification Search
None
See application file for complete search history.

(56) References Cited

U.S. PATENT DOCUMENTS 8,239,389 B2 * 8/2012 Zagelow ............. G06F 16/2272 707/741
8,856,109 B2 * 10/2014 Karidi ................... G06F 16/951 707/723

(Continued)

FOREIGN PATENT DOCUMENTS

JP 2016-156193 A 9/2016
JP 2020-035159 A 3/2020

(Continued)

OTHER PUBLICATIONS

Training data selection device, robot system and training data selection method, JP-2021107970 (Year: 2021).*

(Continued)

*Primary Examiner* — Jean M Corrielus
(74) *Attorney, Agent, or Firm* — Rimon P.C.

(57) ABSTRACT

A parameter adjustment device comprises a coordinate data acquisition unit that acquires coordinate data of an industrial machine; a parameter generation unit that generates an operation parameter; a parameter storage unit that stores the operation parameter; a state data acquisition unit that acquires state data of the industrial machine; an index data calculation unit that calculates index data based on the state data; a sample storage unit that stores sample data in which the operation parameter is associated with the index data; a parameter search unit that uses the sample data to search for an operation parameter estimated to be appropriate; and a model training unit that uses training data in which an operation parameter estimated to be appropriate is associated with the coordinate data to generate a trained model for estimating an appropriate parameter from the coordinate data.

8 Claims, 17 Drawing Sheets

(56) References Cited

U.S. PATENT DOCUMENTS 10,082,774 B2 * 9/2018 Leonard ................. G05B 11/01
10,884,383 B2 * 1/2021 Leonard ................. G05B 11/01
11,416,369 B1 * 8/2022 Trapani ............... G06F 11/0793
2010/0082630 A1 * 4/2010 Zagelow ............. G06F 16/2272 707/741
2012/0209751 A1 * 8/2012 Chen ...................... G06Q 30/06 705/27.2
2012/0259824 A1 * 10/2012 Zagelow ............. G06F 16/2272 707/696
2013/0346401 A1 * 12/2013 Karidi ................... G06F 16/951 707/723
2015/0012524 A1 * 1/2015 Heymans .............. G06F 16/335 707/722
2015/0254310 A1 * 9/2015 Imaizumi ............ G06F 16/9535 707/723
2016/0247332 A1 * 8/2016 Egawa .................... E02F 9/264
2018/0075074 A1 * 3/2018 Shimizu .............. G06F 16/2272
2018/0173173 A1 * 6/2018 Leonard ................. G05B 11/01
2019/0042763 A1 * 2/2019 Zhao ....................... G06F 21/60
2019/0250569 A1 * 8/2019 Leonard ................. G05B 11/01
2019/0324780 A1 * 10/2019 Zhu ........................ G06Q 10/00
2019/0354638 A1 * 11/2019 Kievit-Kylar ..... G06F 16/90324
2019/0370328 A1 * 12/2019 Okura ................... G06F 16/901
2020/0278646 A1 * 9/2020 Sakiyama ............ G05B 13/048
2021/0019284 A1 * 1/2021 Bowman ............... G06F 16/278
2021/0034683 A1 * 2/2021 Iyer ..................... G06F 16/9535
2021/0158171 A1 * 5/2021 Rausch ............... H04L 67/1097
2021/0394338 A1 * 12/2021 Nakamura ............ G06F 18/214
2022/0139070 A1 * 5/2022 Okamoto ............... G06N 20/00 382/159
2023/0045162 A1 2/2023 Yamamoto et al.
2023/0241770 A1 8/2023 Itou et al.

FOREIGN PATENT DOCUMENTS

JP 2021107970 A * 7/2021 ............. G06N 3/084
JP 2024163030 A * 11/2024 ......... G06Q 30/0282
WO 2022/013933 A1 1/2022

OTHER PUBLICATIONS

International Search Report dated Sep. 26, 2023, from International Application No. PCT/JP2023/026367, 4 pages. (with English translation).

* cited by examiner

INFORMATION PROCESSING DEVICE

CROSS-REFERENCE TO RELATED APPLICATIONS

This application is the U.S. National Phase under 35 U.S.C. § 371 of International Application No. PCT/JP2023/026367, filed on Jul. 19, 2023, which claims the benefit of foreign priority to Japanese Patent Application Nos. 2022-126508 filed on Aug. 8, 2022, and 2023-003909 filed Jan. 13, 2023, the entire contents of each of which are hereby incorporated by reference.

TECHNICAL FIELD

The present disclosure relates to an information processing device that automatically adjusts an operation parameter used to control an operation of a drive device for an industrial machine and the like used to position a production facility.

BACKGROUND ART

PTL 1 discloses a parameter adjustment device that applies an appropriate control parameter in response to an operate command for an industrial machine. The parameter adjustment device described in PTL 1 generates a model by machine-learning for estimating an optimal control parameter from state data, based on state data including at least one command for speed, acceleration and jerk in an operation of the industrial machine, and an optimal parameter for the operation acquired from a controller that controls the industrial machine, and the parameter adjustment device acquires an appropriate operation parameter from the model in accordance with the operate command and applies the operation parameter.

CITATION LIST

Patent Literature

PTL 1: Japanese Patent Laying-Open No. 2020-035159

SUMMARY OF INVENTION

Technical Problem

In controlling an operation of an industrial machine such as a multiaxial robot, correcting vibration and trajectory deviation in the operation of the industrial machine requires adjusting control parameters including a gain parameter. Appropriately adjusting control parameters requires knowledge about control and a sensor, and in addition, industrial machines have individual differences, which requires an experience sufficient to handle them, and currently, control parameters are still adjusted by manual trial and error.

PTL 1 proposes a parameter adjustment device that sets a more suitable control parameter in accordance with commands for speed, acceleration, jerk, etc. of an industrial machine such as a machine tool and a robot. However, for example, in an operation such as positioning between preset coordinates, when it is desired that an industrial machine operate as quickly as possible for the purpose of reducing an operation time, some time and effort will be required to adjust the speed, the acceleration, and the jerk to appropriate values as well.

In particular, when rigidity and vibration characteristics of a positioning device to be controlled significantly vary depending on the positioning device's current position and posture, using a set of control parameters fixed for an entire region in which positioning can be done requires considering a posture of a poor condition, and thus it is difficult to reduce an operation time in general.

The present disclosure has been made to solve the above-described problem, and an object of the present disclosure is to estimate an operation parameter (a control parameter) suitable for performing an operation of a drive device without performing adjustment by manual trial and error as conventional.

Solution to Problem

According to the present disclosure, an information processing device is an information processing device for a drive device controlled by a controller, comprising: a coordinate data acquisition unit that externally acquires coordinate data representing operation coordinates of the drive device; a parameter generation unit that generates an operation parameter used to control the drive device by the controller; a parameter storage unit that stores the operation parameter; a state data acquisition unit that acquires state data representing a state of the drive device while the drive device operates in accordance with the operation parameter; an index data calculation unit that calculates index data based on the state data and serving as an index for determining whether the operation parameter is appropriate; a sample storage unit that stores sample data in which the operation parameter is associated with the index data; a parameter search unit that uses the sample data to search for an operation parameter estimated to be appropriate based on the index data; and a model training unit that uses training data in which an operation parameter estimated by the parameter search unit to be appropriate is associated with the coordinate data to generate a trained model for estimating from the coordinate data an appropriate parameter which is an operation parameter suitable for performing an operation for the coordinate data.

Advantageous Effects of Invention

According to the present disclosure, an operation parameter is generated by inputting coordinate data to a coordinate data acquisition unit, index data is calculated from state data based on the operation parameter, and an operation parameter estimated to be appropriate is searched for based on the index data. And training data in which the operation parameter estimated to be appropriate is associated with the coordinate data is used to generate a trained model to estimate an appropriate parameter from the coordinate data. That is, simply inputting coordinate data to the information processing device allows a trained model to be generated to estimate an appropriate parameter from the coordinate data. Thus, without performing parameter adjustment by manual trial and error as conventional, instead simply inputting coordinate data to the trained model allows estimation of an operation parameter suitable for performing an operation for the coordinate data.

DESCRIPTION OF EMBODIMENTS

Hereinafter, an embodiment of the present disclosure will be described with reference to the drawings. In the following figures, identical or equivalent components are identically denoted and will not be described repeatedly.

Figure 1:
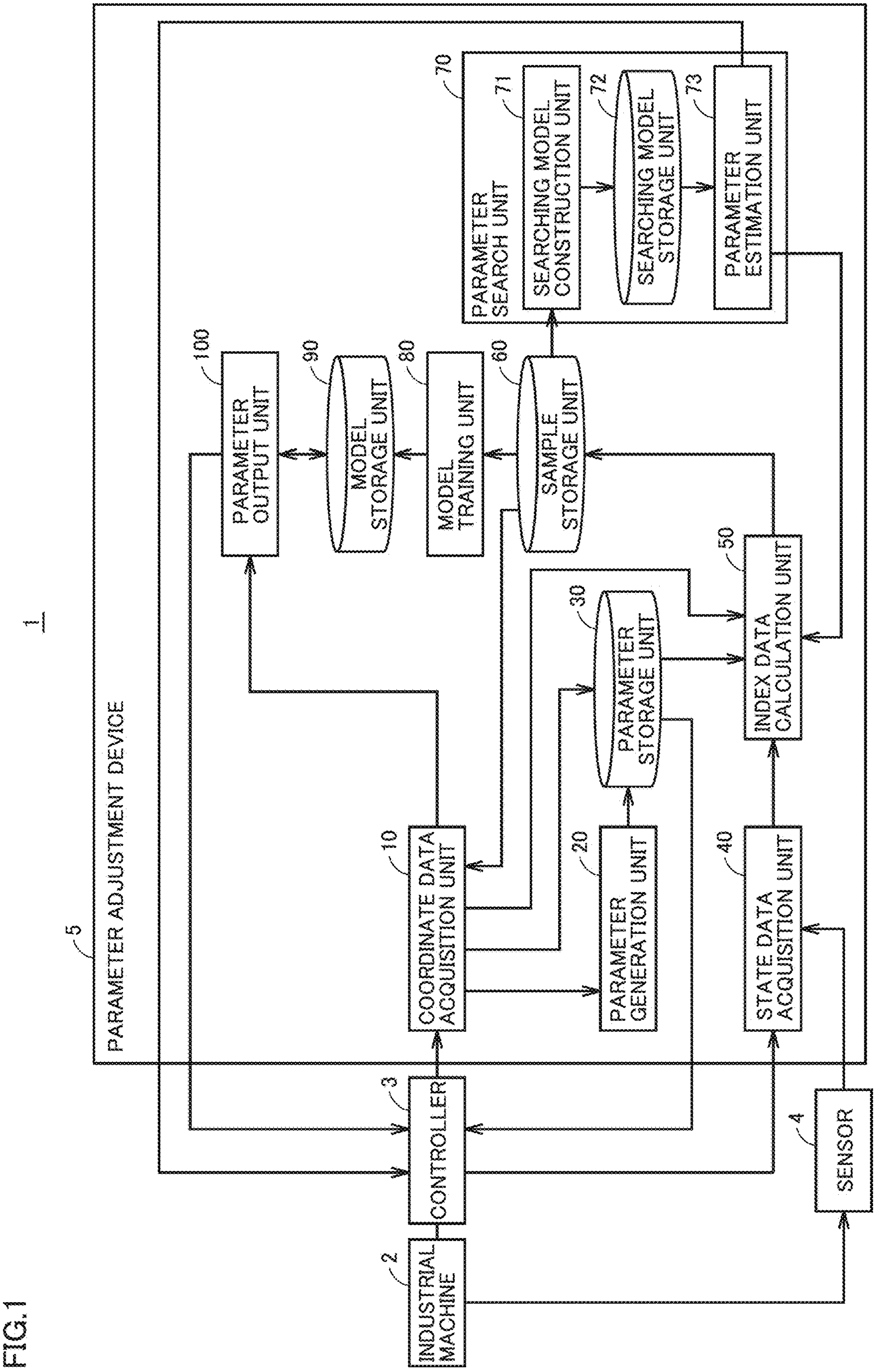
FIG. 1 schematically, generally shows an example of a configuration of a control system comprising a parameter adjustment device (an information processing device).

FIG. 1 is a diagram schematically, generally showing an example of a configuration of a control system 1 including a parameter adjustment device 5 (an information processing device) according to the present embodiment.

Control system 1 comprises an industrial machine 2, a controller 3, a sensor 4, and a parameter adjustment device 5. Industrial machine 2 includes a drive device (an actuator such as a motor or a pneumatic cylinder) to be controlled by controller 3. Industrial machine 2 is, for example, a multi-axial robot, a machine tool, or the like used in a production facility or the like.

Controller 3 controls an operation (a positioning operation, etc.) of industrial machine 2 in accordance with preset operation parameters. The operation parameters are a parameter for speed such as velocity and acceleration when industrial machine 2 operates, and a control parameter used to control industrial machine 2. The control parameter is, for example, a gain parameter in PID control, a coefficient for state feedback, and a parameter for robust control.

Controller 3 can acquire state data of industrial machine 2. The state data is data representing a state during an operation of industrial machine 2, and is, for example, a signal generated by a program previously incorporated in controller 3, a value of a current passing through a motor to be controlled, a feedback signal such as a tracking error, and the like. Parameter adjustment device 5 can acquire state data of industrial machine 2 from controller 3.

A plurality of pieces of coordinate data are set in controller 3. The coordinate data is data that is a set of start point coordinates and end point coordinates in operating industrial machine 2. For example, when controller 3 controls a motor of industrial machine 2, the coordinate data can be data that is a set of a start point angle and an end point angle of an output shaft of the motor.

Sensor 4 senses the state data of industrial machine 2. Sensor 4 is, for example, an acceleration pickup. Parameter adjustment device 5 can acquire the state data of industrial machine 2 not only from controller 3 but also from sensor 4 as necessary. Sensor 4 may be dispensed with.

Parameter adjustment device 5 is an information processing device that receives coordinate data of industrial machine 2 as an input and outputs an appropriate parameter for industrial machine 2. The appropriate parameter is an operation parameter suitable for industrial machine 2 to perform an operation for given coordinate data. In the present embodiment, whether an operation parameter is appropriate is determined based on index data calculated by an index data calculation unit 50, as will be described hereinafter. That is, the index data is data serving as an index for evaluating whether an operation parameter is appropriate. For example, when industrial machine 2 performs a positioning operation, the index data can be the duration of the positioning operation, the maximum amplitude of the vibration after the positioning operation ends, the time of the vibration, a cumulative value of positional deviation, or a combination thereof. For example, when the index data is the duration of the positioning operation, then, of operation parameters, an operation parameter allowing the duration of the positioning operation to fall within a preset threshold value is determined as appropriate.

Parameter adjustment device 5 comprises a coordinate data acquisition unit 10, a parameter generation unit 20, a parameter storage unit 30, a state data acquisition unit 40, an index data calculation unit 50, a sample storage unit 60, a parameter search unit 70, a model training unit 80, a model storage unit 90, and a parameter output unit 100.

When coordinate data acquisition unit 10 receives an acquire coordinates command from sample storage unit 60, the coordinate data acquisition unit acquires from controller 3 coordinate data which is not stored in sample storage unit 60. For example, coordinate data acquisition unit 10 compares the coordinate data stored in sample storage unit 60 with the coordinate data stored in controller 3, and when the coordinate data stored in controller 3 includes coordinate data which is not stored in sample storage unit 60, the coordinate data acquisition unit acquires the coordinate data that is not stored in sample storage unit 60 from controller 3.

Coordinate data acquisition unit 10 having acquired the coordinate data from controller 3 determines whether the coordinate data is to be used in a training phase or a utilization phase. The training phase is a phase for generating a trained model for estimating an appropriate parameter from coordinate data. The utilization phase is a phase in which coordinate data is input to the trained model that is generated in the training phase to output an appropriate parameter. For example, when coordinate data acquisition unit 10 receives from sample storage unit 60 an acquire coordinates command including information indicating a purpose of using coordinate data, then, depending on the purpose included in the acquire coordinates command, the coordinate data acquisition unit determines whether the coordinate data acquired from controller 3 is to be used in the training phase or the utilization phase.

[Training Phase]

When the coordinate data acquired from controller 3 is used in the "training phase", parameter adjustment device 5 generates in two stages a trained model receiving the coordinate data as an input and outputting an appropriate parameter. In a first stage, parameter search unit 70, which will be described hereinafter, searches for an appropriate parameter for each of a plurality of coordinate data (or operations) set in controller 3. In a second stage, model training unit 80, which will be described hereinafter, employs machine-learning to generate from a plurality of combinations each of coordinate data and an appropriate parameter for the coordinate data (i.e., training data) a trained model receiving coordinate data as an input and outputting an appropriate parameter. Hereinafter, how the trained model is generated will be described in detail.

When coordinate data acquisition unit 10 determines that the coordinate data acquired from controller 3 is to be used in the "training phase", the coordinate data acquisition unit outputs a generate parameter command to parameter generation unit 20 together with the coordinate data.

Whenever parameter generation unit 20 receives coordinate data and the generate parameter command from coordinate data acquisition unit 10, the parameter generation unit generates a first predetermined number of operation parameters for the received coordinate data, and stores the generated first predetermined number of operation parameters to parameter storage unit 30 together with the coordinate data.

For example, parameter generation unit 20 generates an operation parameter sampled using a probability distribution such as a uniform distribution from a search range for operation parameters that is preset before a trained model is generated. The search range for operation parameters may for example be a range between a lower limit value and an upper limit value preset for operation parameters before the trained model is generated.

The number of operation parameters generated for each coordinate data (that is, the above-described "first predetermined number") is set depending on a parameter search method of parameter search unit 70 as will be described hereinafter. Specifically, the first predetermined number is set to a value equal to or larger than a number necessary for parameter search unit 70 to search for a candidate appropriate parameter for each coordinate data, as will be described hereinafter. As the first predetermined number, for example, an appropriate value may externally be set.

When Bayesian optimization is used as a method for searching for a candidate appropriate parameter by parameter search unit 70, the number (i.e., the first predetermined number) of operation parameters generated for each coordinate data can be set to "1" in view of the fact that Bayesian optimization can search for an appropriate value even from one point of data. When this is compared with using a regression model other than Bayesian optimization as a method for searching for an appropriate parameter, the former can reduce the number of operation parameters generated.

When the number (the first predetermined number) of operation parameters generated for each coordinate data is two or more operation parameters, parameter generation unit 20 assigns a sequential label to each of the two or more generated operation parameters. The sequential labels indicate a sequence in which controller 3 operates industrial machine 2.

Figure 2:
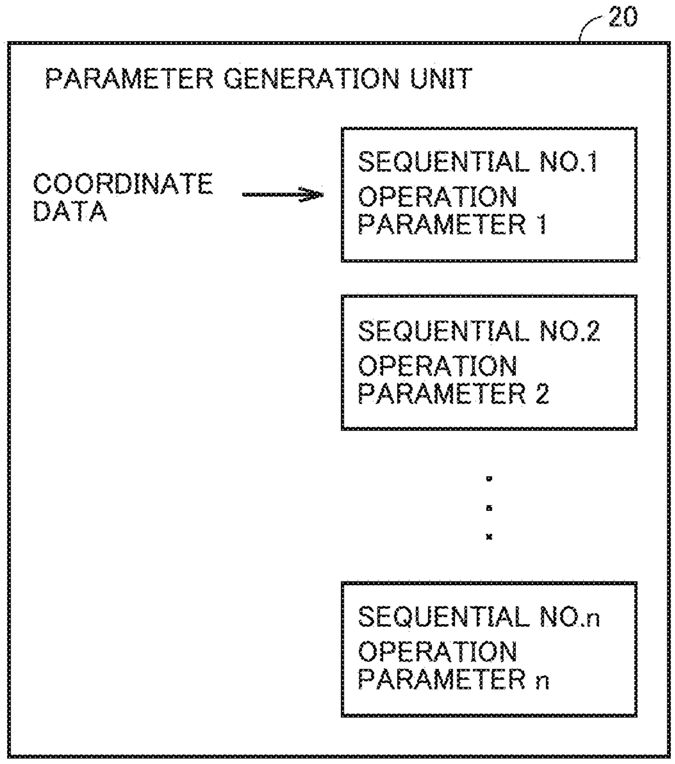
FIG. 2 shows an example of generating parameters.

FIG. 2 is a diagram showing an example of generating parameters when the first predetermined number is n, where n is an integer of 2 or larger, that is, when n operation parameters are generated for given coordinate data and assigned n sequential labels, respectively. The n sequential labels are represented, for example, by consecutive integer values from 1 to n. Parameter generation unit 20 stores n (or the first predetermined number of) sequentially labeled operation parameters to parameter storage unit 30 together with the coordinate data. The value of the first predetermined number may be a fixed value or may be a variable value varying with the coordinate data.

Returning to FIG. 1, when the first predetermined number of operation parameters sequentially labeled for given coordinate data, as shown in FIG. 2, are stored in parameter storage unit 30, the parameter storage unit outputs an operate command including their data to controller 3.

Upon receiving the operate command from parameter storage unit 30, controller 3 uses the first predetermined number of operation parameters included in the operate command to control industrial machine 2 to perform an operation for the coordinate data included in the operate command, sequentially as indicated by the sequential labels. Thus, an operation for single coordinate data included in an operate command is performed the same number of times as the first predetermined number while changing operation parameters.

When parameter storage unit 30 outputs an operate command to controller 3, the parameter storage unit also outputs the operate command to index data calculation unit 50. In doing so, parameter storage unit 30 assigns the operate command a label indicating that the operate command is sourced from parameter storage unit 30.

State data acquisition unit 40 acquires state data of industrial machine 2 from controller 3 or sensor 4 while controller 3 operates industrial machine 2, and the state data acquisition unit outputs a calculate command to index data calculation unit 50 together with the acquired state data.

Upon receiving the state data and the calculate command from state data acquisition unit 40, index data calculation unit 50 uses the acquired state data to calculate index data, and acquires from parameter storage unit 30, or parameter search unit 70 as will be described hereinafter, the operation parameter that is applied when state data acquisition unit 40 acquires the state data.

As has been described above, the index data is data serving as an index for evaluating whether an operation parameter is appropriate, and is, for example, a duration of a positioning operation of industrial machine 2. For example, when controller 3 continuously transmits a signal as one of the state data during an operation of industrial machine 2, a period of time for which the signal is continuously transmitted can be index data (a duration of a positioning operation).

Two or more types of index data may be used. For example, while the duration described above is an index for an operation time of industrial machine 2, in addition thereto, an index reflecting residual vibration resulting from positioning may also be calculated and a combination of the two data of the operation time and the residual vibration may be used as one index data. The data may be combined for example such that two or more indices may have their values linearly combined or each index may have its value held.

As an index representing the residual vibration is considered data that is obtained from an acceleration pickup disposed at an end of industrial machine 2 and is processed, for example. Alternatively, torque data may be acquired from the drive device that controls industrial machine 2 and a value obtained by linearly combining an amplitude of vibration of the torque data and an attenuation rate of a torque waveform may be used as the index representing the residual vibration.

Furthermore, index data calculation unit 50 determines whether an acquired operation parameter is an operation parameter acquired from parameter storage unit 30 or an operation parameter acquired from parameter search unit 70 (i.e., a candidate appropriate parameter described hereinafter). For example, when the acquired operation parameter is assigned a label indicating the source of the operation parameter, index data calculation unit 50 refers to the label to determine whether the acquired operation parameter is an operation parameter acquired from parameter storage unit 30 or an operation parameter acquired from parameter search unit 70.

When the acquired operation parameter is an operation parameter acquired from parameter storage unit 30, index data calculation unit 50 generates sample data in which the acquired operation parameter is associated with index data, assigns the sample data a label indicating that the operation parameter is acquired from parameter storage unit 30 and the operation (or coordinate data) for each sample data, and thus stores the sample data to sample storage unit 60.

Note that a process performed when the operation parameter acquired by index data calculation unit 50 is an operation parameter retrieved by parameter search unit 70 (i.e., a candidate appropriate parameter described hereinafter) will be described hereinafter in detail.

The above-described sample data generation process is performed for each of a plurality of coordinate data that parameter generation unit 20 receives from coordinate data acquisition unit 10. Therefore, for each coordinate data, a plurality (or first predetermined number) of sample data are stored in sample storage unit 60.

Sample storage unit 60 transmits the stored sample data to parameter search unit 70. In doing so, sample storage unit 60 transmits to parameter search unit 70 all (or the first predetermined number of or more) sample data stored for each coordinate data.

Parameter search unit 70 has a function of estimating (or searching for) an appropriate parameter for each of the plurality of coordinate data based on the sample data received from sample storage unit 60. Specifically, parameter search unit 70 includes a searching model construction unit 71, a searching model storage unit 72, and a parameter estimation unit 73.

When searching model construction unit 71 acquires sample data from sample storage unit 60, the searching model construction unit uses the sample data acquired from sample storage unit 60 to generate a searching model. The searching model is a regression model that infers a black box function receiving an operation parameter as an input and outputting index data. The searching model is generated for each of the plurality of coordinate data.

Then, searching model construction unit 71 outputs the generated searching model to searching model storage unit 72 as a searching model together with the coordinate data added to the sample data. Thus, a plurality of searching models respectively corresponding to the plurality of coordinate data are stored in searching model storage unit 72.

Searching model storage unit 72 having stored the searching models generated by searching model construction unit 71 outputs an estimate parameter command to parameter estimation unit 73.

Upon receiving the estimate parameter command from searching model storage unit 72, parameter estimation unit 73 estimates an operation parameter estimated to be appropriate (an operation parameter serving as a candidate for an appropriate parameter, hereinafter also referred to as a "candidate appropriate parameter") based on the searching model stored in searching model storage unit 72. Then, parameter estimation unit 73 outputs an operate command to controller 3 to cause industrial machine 2 to perform an operation for the coordinate data used in estimating a candidate appropriate parameter, and outputs the estimated candidate appropriate parameter to index data calculation unit 50.

Estimation of a candidate appropriate parameter by parameter search unit 70 can be done for example through Bayesian optimization. In that case, initially, a Gaussian process regression model is generated in searching model construction unit 71 and stored in searching model storage unit 72 as a searching model. Thereafter, parameter estimation unit 73 uses the searching model to perform Bayesian optimization to estimate (or search for) a candidate appropriate parameter. How to search based on Bayesian optimization is described in papers and the like and thus known, and accordingly, will not be described in detail.

When the index data includes two or more types of indices with their values held as a set, a multi-objective optimization algorithm may be used to estimate a candidate appropriate parameter. Multi-objective optimization is described in papers and the like and thus known, and accordingly, will not be described in detail. For example, if Bayesian optimization is used to estimate a candidate appropriate parameter, EHVI (Expected Hypervolume Improvement) can be used for an acquisition function to estimate a Pareto solution based on two or more indices as a candidate appropriate parameter.

A candidate appropriate parameter may be estimated in a method other than Bayesian optimization. For example, the method may use a neural network for a regression model and use a gradient method for an optimization method. Alternatively, the method may render a function receiving an operation parameter as an input and outputting index data by a spline curve and estimate a parameter corresponding to one of peak values as an appropriate parameter.

Upon receiving an operation parameter (a candidate appropriate parameter) from parameter search unit 70, index data calculation unit 50 uses state data acquired from state data acquisition unit 40 to calculate index data, and uses the calculated index data to determine whether the operation parameter acquired from parameter search unit 70 is an appropriate parameter. For example, index data calculation unit 50 compares the calculated index data with index data preset for comparison, and when the calculated index data is regarded as being significantly improved with respect to the index data for comparison, the index data calculation unit determines that the operation parameter (the candidate appropriate parameter) received from parameter search unit 70 is an appropriate parameter.

When the index data is only one type of index, for example, index data calculation unit 50 quantifies a difference d between calculated index data y and index data for comparison ys by using the following equation (1).

$$D = 1 - y/ys \tag{1}$$

When difference d calculated by equation (1) falls within a preset threshold value, index data calculation unit 50 determines that the received operation parameter (or candidate appropriate parameter) is an appropriate parameter. On the other hand, when difference d calculated by equation (1) does not fall within the preset threshold value, index data calculation unit 50 determines that the received operation parameter (or candidate appropriate parameter) is not an appropriate parameter.

When the index data includes two or more types of indices with their values held as a set, for example, equation (1) is calculated for each index constituting the index data to calculate difference d for each index and differences d calculated for the indices are added together, and if the sum falls within a preset threshold value, the received operation parameter is determined as an appropriate parameter.

When the received operation parameter (or candidate appropriate parameter) is an appropriate parameter, index data calculation unit 50 assigns the sample data in which the operation parameter is associated with the index data a label indicating that the operation parameter in the sample data is acquired from parameter search unit 70, the operation (or coordinate data) for the sample data, and a label indicating that the operation parameter in the sample data is an appropriate parameter, and the index data calculation unit thus stores the sample data to sample storage unit 60.

On the other hand, when the received operation parameter (or candidate appropriate parameter) is not an appropriate parameter, index data calculation unit 50 assigns the sample data in which the operation parameter is associated with the index data a label indicating that the operation parameter in the sample data is acquired from parameter search unit 70, the operation (or coordinate data) for the sample data, and a label indicating that the operation parameter in the sample data is not an appropriate parameter, and the index data calculation unit thus stores the sample data to sample storage unit 60.

Each label assigned to the sample data may for example be a two-valued integer of "0" or "1". A plurality of labels assigned to the sample data may be integrated into one label. For example, when the operation parameter in the sample data is an operation parameter acquired from parameter storage unit 30, "0" may be assigned; when the operation parameter in the sample data is an operation parameter retrieved by parameter search unit 70 and is not an appropriate parameter, "1" may be assigned; and when the operation parameter in the sample data is an operation parameter retrieved by parameter search unit 70 and is an appropriate parameter, "2" may be assigned, i.e., a three-valued integer may be assigned. This can reduce the number of labels to be assigned to the sample data.

Figure 3:
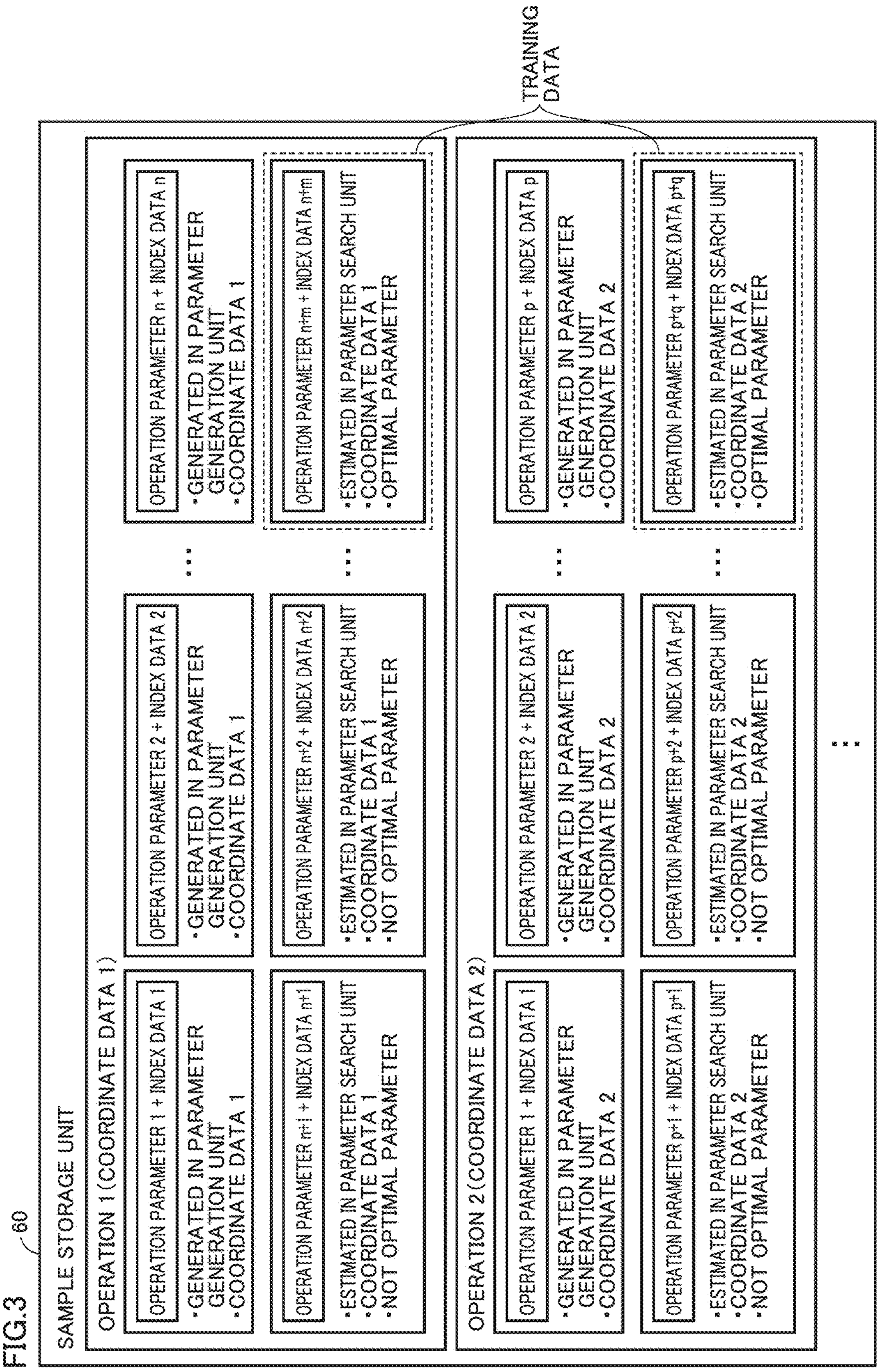
FIG. 3 shows an example of sample data.

FIG. 3 shows an example of sample data stored in sample storage unit 60. FIG. 3 shows an example in which a plurality of sample data are generated for each of a plurality of operations 1, 2, . . . (a plurality of coordinate data 1, 2, . . . ).

The sample data for operation 1 (or coordinate data 1) includes n pieces of sample data obtained by performing operation 1 *n* times based on n operation parameters generated by parameter generation unit 20 and m pieces of sample data obtained by performing operation 1 *m* times based on m operation parameters estimated by parameter search unit 70, for a total of (n+m) pieces of sample data.

Further, the n pieces of sample data including the operation parameters generated by parameter generation unit 20 are each assigned a label indicating that the operation parameter is generated by parameter generation unit 20 and a label indicating coordinate data 1. The m pieces of sample data including the operation parameters estimated by parameter search unit 70 are each assigned a label indicating that the operation parameter is estimated by parameter search unit 70 and a label indicating coordinate data 1, and in addition thereto a label indicating whether the operation parameter is an appropriate parameter.

The sample data for operation 2 corresponding to coordinate data 2 is similar to the sample data for operation 1. Specifically, the sample data for operation 2 includes p pieces of sample data including p operation parameters generated by parameter generation unit 20 and q pieces of sample data including q operation parameters estimated by parameter search unit 70, for a total of (p+q) pieces of sample data.

The p pieces of sample data including the operation parameters generated by parameter generation unit 20 are each assigned a label indicating that the operation parameter is generated by parameter generation unit 20 and a label indicating coordinate data 2. The q pieces of sample data including the operation parameters estimated by parameter search unit 70 are each assigned a label indicating that the operation parameter is estimated by parameter search unit 70 and a label indicating coordinate data 2, and in addition thereto a label indicating whether the operation parameter is an appropriate parameter.

In the example indicated in FIG. 3, for operation 1 (coordinate data 1), the operation parameter included in the (n+m)th sample data is determined as an appropriate parameter. For operation 2 (coordinate data 2), the operation parameter included in the (p+q)th sample data is determined as an appropriate parameter. Such a combination of coordinate data and an appropriate parameter for the coordinate data is used as training data to generate a trained model by model training unit 80, as will be described hereinafter.

While the example shown in FIG. 3 shows two sets of (coordinate data 1, operation parameter n+m) and (coordinate data 2, operation parameter p+q) as training data, in practice, a second predetermined number of training data set depending on the model training method of model training unit 80, as will be described hereinafter, are stored in sample storage unit 60. The "second predetermined number" that is the number of pieces of training data stored in sample storage unit 60 is set to a value equal to or larger than a number necessary for generating a trained model by model training unit 80, as will be described hereinafter.

Returning to FIG. 1, when the second predetermined number of training data are stored in sample storage unit 60, sample storage unit 60 transmits a train model command to model training unit 80.

Upon receiving the train model command from sample storage unit 60, model training unit 80 uses the second predetermined number of training data stored in sample storage unit 60 to generate a trained model receiving coordinate data as an input and outputting an appropriate parameter. Model training unit 80 generates the trained model by deep learning using a neural network, for example. Model training unit 80 stores the generated trained model to model storage unit 90.

Figure 4:
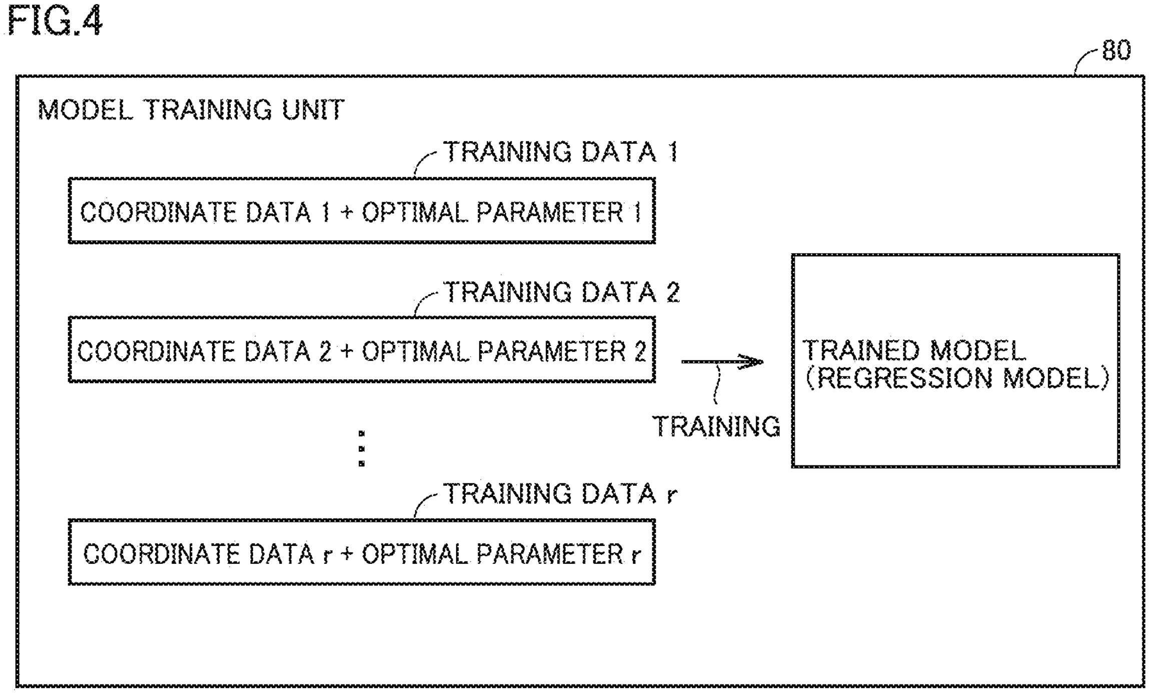
FIG. 4 is a diagram (part 1) schematically showing an example of training by a model training unit.

FIG. 4 schematically shows an example of training by model training unit 80. The trained model illustrated in FIG. 4 is a regression model obtained through machine learning (for example, deep learning using a neural network). As illustrated in FIG. 4, model training unit 80 performs machine learning using r pieces (or the second predetermined number) of training data (combinations each of coordinate data and an appropriate parameter) to generate a trained model receiving coordinate data as an input and outputting an appropriate parameter.

Figure 5:
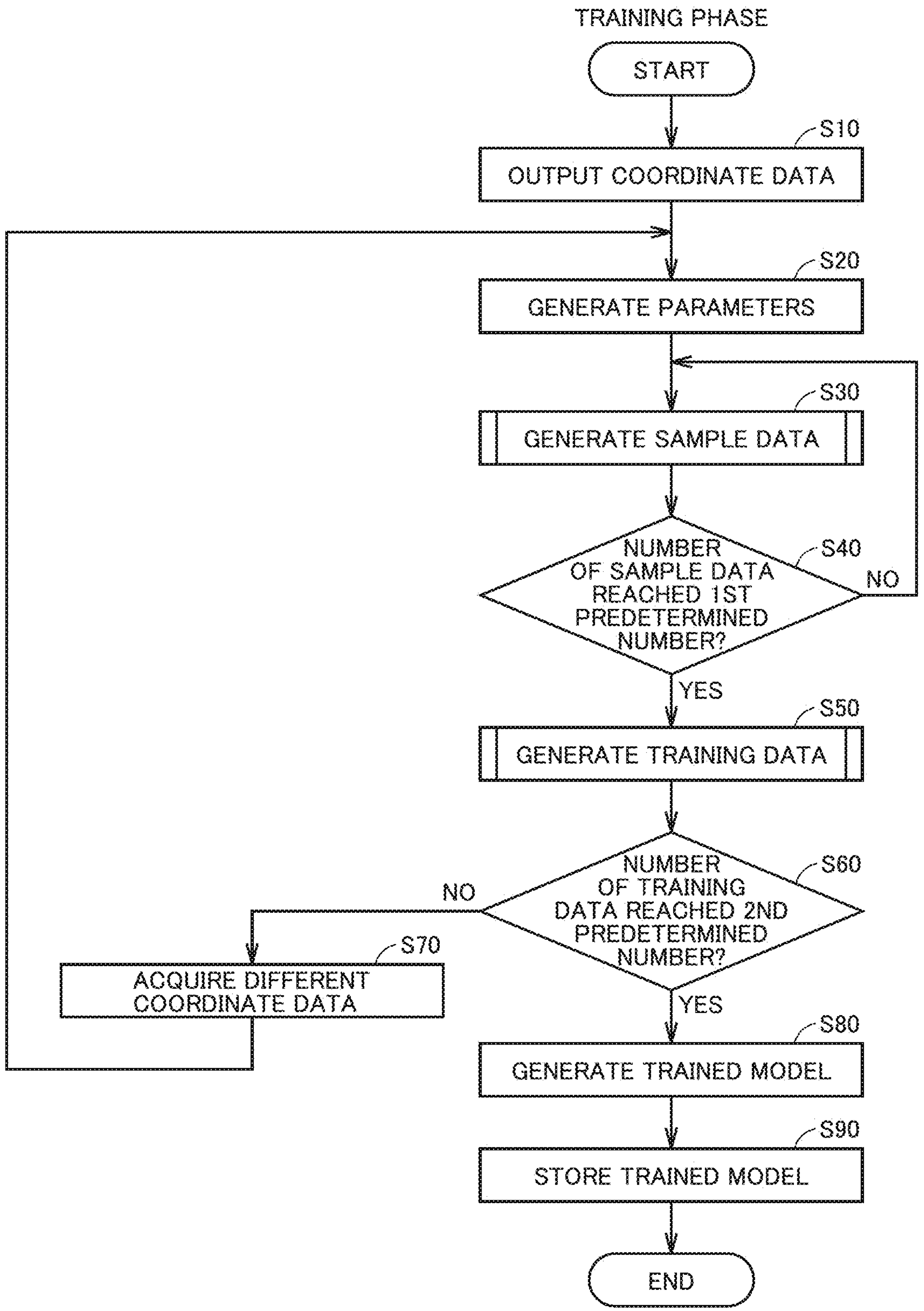
FIG. 5 is a flowchart of an example of a procedure of a process for generating a trained model.

FIG. 5 is a flowchart of an example of a procedure of a process in which parameter adjustment device 5 generates a trained model in the training phase. This flowchart starts when coordinate data acquisition unit 10 determines that coordinate data acquired from controller 3 is to be used in the "training phase".

Initially, coordinate data acquisition unit 10 outputs a generate parameter command to parameter generation unit 20 together with the coordinate data acquired from controller 3 (step S10).

Subsequently, parameter generation unit 20 generates the first predetermined number of operation parameters for the coordinate data received from coordinate data acquisition unit 10, and stores the generated first predetermined number of operation parameters to parameter storage unit 30 together with the coordinate data (step S20).

Subsequently, parameter storage unit 30 performs a process for generating sample data (step S30).

Figure 6:
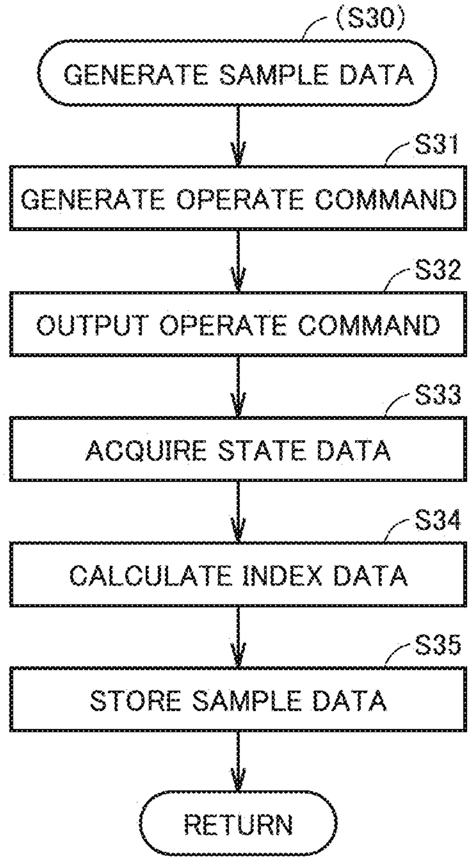
FIG. 6 is a flowchart of an example of a detailed flow of a process for generating sample data.

FIG. 6 is a flowchart of an example of a detailed flow of the process for generating sample data (step S30 in FIG. 5).

Parameter storage unit 30 determines an operation parameter to be currently processed from the stored first predetermined number of operation parameters with reference to the above-described sequential labels, and generates an operate command including the determined operation parameter and the coordinate data (step S31).

Subsequently, parameter storage unit 30 outputs the generated operate command to controller 3 (step S32). Controller 3 operates industrial machine 2 in response to the operate command.

Subsequently, state data acquisition unit 40 acquires state data of industrial machine 2 from controller 3 or sensor 4 while controller 3 operates industrial machine 2 (step S33).

Subsequently, state data acquisition unit 40 outputs a calculate command to index data calculation unit 50 together with the acquired state data (step S34). Index data calculation unit 50 calculates index data.

Subsequently, index data calculation unit 50 assigns sample data in which the operation parameter is associated with the index data a label indicating that the operation parameter is an operation parameter generated by parameter generation unit 20, and the index data calculation unit thus stores the sample data to sample storage unit 60 (step S35).

Returning to FIG. 5, index data calculation unit 50 determines whether the number of pieces of sample data stored in sample storage unit 60 has reached the first predetermined number (step S40). When the number of pieces of sample data has not reached the first predetermined number (NO in step S40), index data calculation unit 50 repeats step S30 until the number of pieces of sample data reaches the first predetermined number while sequentially changing operation parameters to be processed according to the sequential labels.

When the sample data reach the first predetermined number (YES in step S40), a process for generating training data is performed (step S50).

Figure 7:
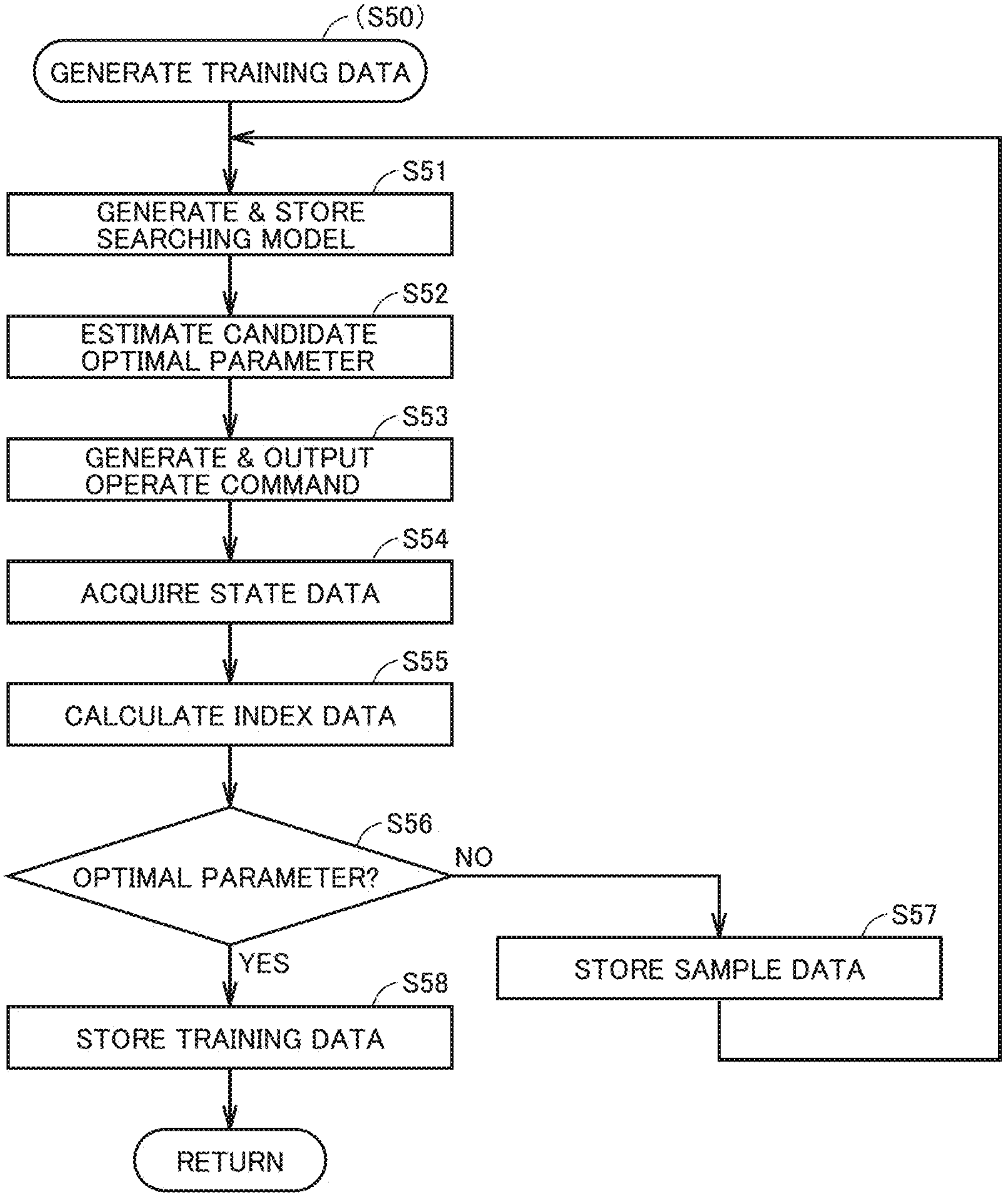
FIG. 7 is a flowchart of an example of a detailed flow of a process for generating training data.

FIG. 7 is a flowchart of an example of a detailed flow of a process for generating training data (step S50 in FIG. 5).

Initially, parameter search unit 70 uses all the stored (i.e., the first predetermined number of or more) sample data to generate a searching model which receives an operation parameter and outputs index data, and the parameter search unit stores the generated searching model to searching model storage unit 72 (step S51).

Subsequently, parameter search unit 70 uses the searching model stored in searching model storage unit 72 to estimate a candidate appropriate parameter for the coordinate data received from coordinate data acquisition unit 10 (step S52).

Subsequently, parameter search unit 70 generates an operate command including the estimated candidate appropriate parameter and the coordinate data, and outputs the generated operate command to controller 3 (step S53). Controller 3 operates industrial machine 2 in response to the operate command.

Subsequently, state data acquisition unit 40 acquires state data of industrial machine 2 from controller 3 or sensor 4 while controller 3 operates industrial machine 2 (step S54).

Subsequently, state data acquisition unit 40 outputs a calculate command to index data calculation unit 50 together with the acquired state data (step S55). Index data calculation unit 50 calculates index data.

Subsequently, index data calculation unit 50 uses the calculated index data to determine whether the current candidate appropriate parameter is an appropriate parameter (step S56).

When it is determined that the current candidate appropriate parameter is not an appropriate parameter (NO in step S56), index data calculation unit 50 assigns the sample data in which the current candidate appropriate parameter is associated with the index data a label indicating that the current candidate appropriate parameter is a candidate appropriate parameter acquired from parameter search unit 70 and a label indicating that the current candidate appropriate parameter is not an appropriate parameter, and the index data calculation unit thus stores the sample data to sample storage unit 60 (step S57). Thereafter, the control returns to step S51, and steps S51 to S56 are repeated until a candidate appropriate parameter determined to be an appropriate parameter is estimated.

When a candidate appropriate parameter determined to be an appropriate parameter is estimated (YES in step S56), index data calculation unit 50 assigns the sample data in which that candidate appropriate parameter is associated with the index data a label indicating that the parameter is an operation parameter generated by parameter search unit 70 and a label indicating that the parameter is an appropriate parameter, and the index data calculation unit thus stores the sample data to sample storage unit 60 as training data (step S58).

Returning to FIG. 5, index data calculation unit 50 determines whether the number of pieces of training data stored in sample storage unit 60 has reached the second predetermined number (a value equal to or larger than a number necessary for model training unit 80 to generate a trained model) (step S60). When the number of pieces of training data stored in sample storage unit 60 has not reached the second predetermined number (NO in step S60), coordinate data acquisition unit 10 acquires from controller 3 new coordinate data different from the coordinate data stored in sample storage unit 60 (step S70). Thereafter, the control returns to step S20, and steps S20 to S60 are repeated until the number of pieces of training data stored in sample storage unit 60 reaches the second predetermined number.

When the number of pieces of training data stored in sample storage unit 60 has reached the second predetermined number (YES in step S60), model training unit 80 uses the second predetermined number of pieces of training data stored in sample storage unit 60 to generate a trained model receiving coordinate data and outputting an operation parameter (step S80), and stores the generated trained model to model storage unit 90 (step S90).

[Utilization Phase]

The process for the utilization phase will now be described. When coordinate data acquisition unit 10 determines that coordinate data acquired from controller 3 is to be used in the "utilization phase", the coordinate data acquisition unit outputs an output parameter command to parameter output unit 100.

Figure 8:
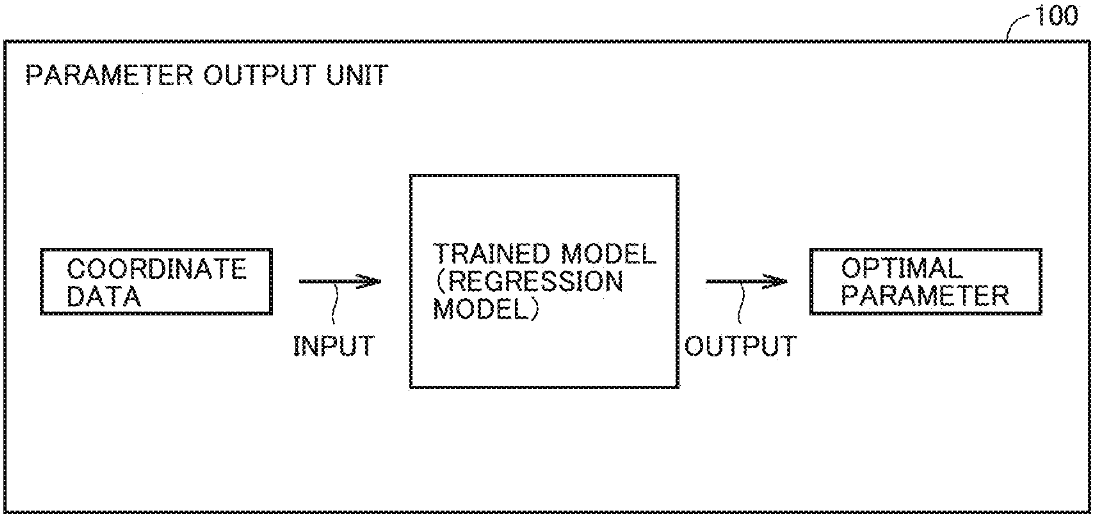
FIG. 8 is a diagram (part 1) of an example of outputting an appropriate parameter.

FIG. 8 shows an example of outputting an appropriate parameter by parameter output unit 100. Upon receiving the output parameter command from coordinate data acquisition unit 10, parameter output unit 100 inputs coordinate data acquired from coordinate data acquisition unit 10 to the trained model stored in model storage unit 90 to output an appropriate parameter for the coordinate data.

Figure 9:
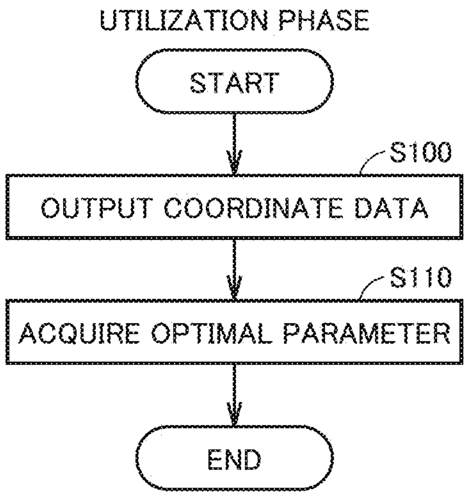
FIG. 9 shows an example of a procedure of a process for outputting an appropriate parameter.

FIG. 9 shows an example of a procedure of a process in which parameter adjustment device 5 outputs an appropriate parameter in the utilization phase. This flowchart starts when coordinate data acquisition unit 10 determines that coordinate data acquired from controller 3 is to be used in the "utilization phase".

Initially, coordinate data acquisition unit 10 outputs the coordinate data acquired from controller 3 to parameter output unit 100 (step S100).

Subsequently, parameter output unit 100 inputs the coordinate data acquired by coordinate data acquisition unit 10 to the trained model stored in model storage unit 90 to acquire an appropriate parameter corresponding to the input coordinate data (step S110).

Parameter adjustment device 5 described above has the following features.

(1) According to the present embodiment, parameter adjustment device 5 comprises: a coordinate data acquisition unit 10 that acquires coordinate data representing operation coordinates of industrial machine 2; a parameter generation unit 20 that generates an operation parameter used to control industrial machine 2 by controller 3; a parameter storage unit 30 that stores the operation parameter and outputs to controller 3 an operate command including the operation parameter; a state data acquisition unit 40 that acquires state data of industrial machine 2 while the industrial machine operates in accordance with the operation parameter; an index data calculation unit 50 that calculates index data based on the state data and serving as an index for determining whether the operation parameter is appropriate; a sample storage unit 60 that stores sample data in which the operation parameter is associated with the index data; a parameter search unit 70 that uses the sample data to search for an operation parameter estimated to be appropriate based on the index data; and a model training unit 80 that uses training data in which an operation parameter estimated by parameter search unit 70 to be appropriate is associated with the coordinate data to generate a trained model for estimating an appropriate parameter from the coordinate data.

In the above configuration, an operation parameter is generated by inputting coordinate data to coordinate data acquisition unit 10, index data is calculated from state data based on the operation parameter, and an operation parameter estimated to be appropriate is searched for based on the index data. And training data in which the operation parameter estimated to be appropriate is associated with the coordinate data is used to generate a trained model to estimate an appropriate parameter from the coordinate data. That is, simply inputting coordinate data to parameter adjustment device 5 allows a trained model to be generated to estimate an appropriate parameter from the coordinate data. Thus, without performing parameter adjustment by manual trial and error as conventional, instead simply inputting coordinate data to the trained model allows an appropriate parameter to be estimated.

(2) Furthermore, parameter adjustment device 5 according to the present embodiment further comprises a model storage unit 90 that stores the trained model generated by model training unit 80, and a parameter output unit 100 that outputs the appropriate parameter by inputting the coordinate data acquired by coordinate data acquisition unit 10 to the trained model stored in model storage unit 90.

An appropriate parameter can be output simply by inputting coordinate data to parameter adjustment device 5.

(3) Further, parameter search unit 70 instructs controller 3 to control industrial machine 2 with the operation parameter estimated by parameter search unit 70 to be appropriate. State data acquisition unit 40 acquires state data (search state data) indicating a state of industrial machine 2 when industrial machine 2 is operated with the operation parameter estimated by parameter search unit 70 to be appropriate. Index data calculation unit 50 calculates the index data based on the search state data. Sample storage unit 60 stores data in which an operation parameter determined to be appropriate based on the search state data is associated with the coordinate data as the training data. Model training unit 80 uses the training data stored in sample storage unit 60 to generate the trained model.

In the above configuration, the operation parameter estimated by parameter search unit 70 to be appropriate is not used as it is as training data; rather, index data is calculated based on state data (search state data) obtained when industrial machine 2 is actually operated with the operation parameter estimated by parameter search unit 70 to be appropriate, and an operation parameter determined to be appropriate based on the index data is used as the training data. This allows the trained model to be generated more appropriately than using the operation parameter estimated by parameter search unit 70 to be appropriate as it is as the training data.

(4) Further, index data calculation unit 50 calculates two or more types of indices based on the search state data and sets a combination of the calculated two or more types of indices as the index data, and parameter search unit 70 uses a multi-objective optimization method to estimate an operation parameter determined to be appropriate based on each index constituting the index data.

This allows a more appropriate parameter to be estimated than linearly combining a plurality of indices into one and using the value as the index data.

(5) Further, parameter generation unit 20 generates a first predetermined number of operation parameters set depending on a parameter search method of parameter search unit 70.

This can prevent industrial machine 2 from being operated wastefully frequently for the purpose of searching by parameter search unit 70. This can in turn reduce a period of time required for parameter adjustment device 5 to generate a searching model.

(6) Further, when a second predetermined number of training data set depending on the model training method of model training unit 80 is stored in sample storage unit 60, model training unit 80 uses the second predetermined number of training data to generate the trained model.

This can prevent industrial machine 2 from being operated wastefully frequently for the purpose of generating a trained model by model training unit 80. This can in turn reduce a period of time required for parameter adjustment device 5 to generate the trained model.

(7) Further, parameter search unit 70 includes a searching model construction unit 71 that uses the sample data stored in sample storage unit 60 to generate a searching model for estimating the index data from the operation parameter, a searching model storage unit 72 that stores the searching model, and a parameter estimation unit 73 that searches for an operation parameter estimated to be appropriate based on the index data estimated through the searching model.

This allows a relationship between the operation parameter and the index data to be understood through the searching model. This in turn allows an appropriate parameter to be searched for more efficiently.

(8) Further, state data acquisition unit 40 acquires torque data from a drive device that operates industrial machine 2, and index data calculation unit 50 sets a linear combination of a value in amplitude of vibration of torque as calculated from the torque data and an attenuation rate in waveform of the torque as an index for residual vibration after industrial machine 2 is positioned.

This allows the index for residual vibration to be calculated even when an acceleration pickup cannot be attached due to a restriction of an end effector attached to the industrial machine.

Further, using the torque data allows data of residual vibration to be obtained even when a speed reducer constituting a positioning device has a large speed reduction ratio.

Further, considering not only the value in amplitude of vibration of the torque but also the attenuation rate of the waveform of the torque allows an index indicating the degree of the residual vibration to be calculated more appropriately.

While parameter adjustment device 5 according to the present embodiment comprises the configurations (1) to (8), the parameter adjustment device according to the present disclosure may comprise at least the configuration (1) and is not necessarily limited to comprising all of the configurations (2) to (8). For example, the parameter adjustment device according to the present disclosure may be a combination of the configuration (1) and at least one of the configurations (2) to (8).

First Modification

Parameter adjustment device 5 according to the above-described embodiment comprises both a configuration of generating a trained model in a training phase and a configuration of outputting an appropriate parameter in a utilization phase.

In contrast, the configuration of generating a trained model in the training phase and the configuration of outputting an appropriate parameter in the utilization phase may be divided into separate devices.

Figure 10:
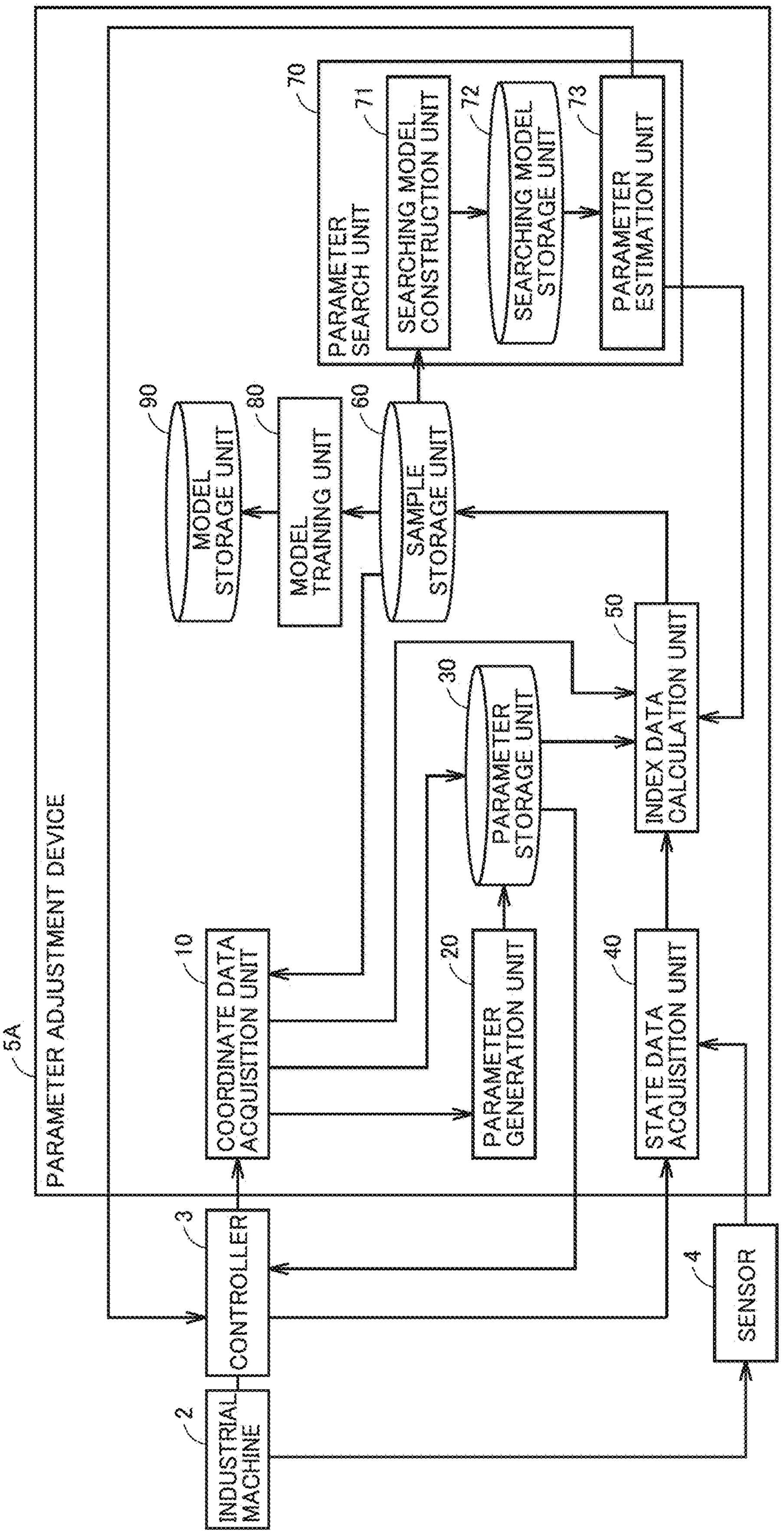
FIG. 10 is a diagram (part 1) schematically showing an example of a configuration of a parameter adjustment device.

FIG. 10 schematically shows an example of a configuration of a parameter adjustment device 5A according to a first modification. Parameter adjustment device 5A according to the first modification corresponds to parameter adjustment device 5 according to the above-described embodiment minus the "parameter output unit 100" that is not used in the training phase and instead used in the utilization phase.

Figure 11:
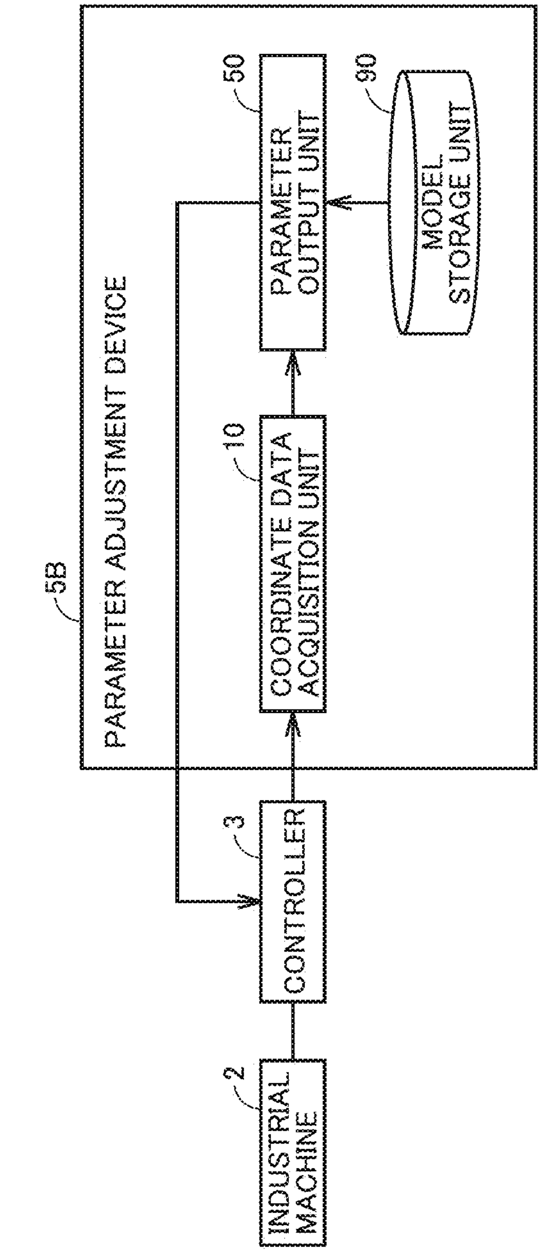
FIG. 11 is a diagram (part 2) schematically showing an example of a configuration of the parameter adjustment device.

FIG. 11 schematically shows an example of a configuration of a parameter adjustment device 5B according to the first modification. Parameter adjustment device 5B according to the first modification corresponds to parameter adjustment device 5 according to the above-described embodiment having removed therefrom any component other than coordinate data acquisition unit 10, model storage unit 90, and parameter output unit 100 used in the utilization phase.

Thus, the configuration of generating a trained model in the training phase and the configuration of outputting an appropriate parameter in the utilization phase may be divided into separate devices. This can reduce performance required for hardware (parameter adjustment device 5B shown in FIG. 11) having the configuration for outputting an appropriate parameter in the utilization phase, in particular, and hence reduce cost.

Second Modification

While in the above embodiment is described an example in which the trained model generated by model training unit 80 is a single regression model (see FIG. 4), the trained model generated by model training unit 80 is not limited to a single regression model.

Figure 12:
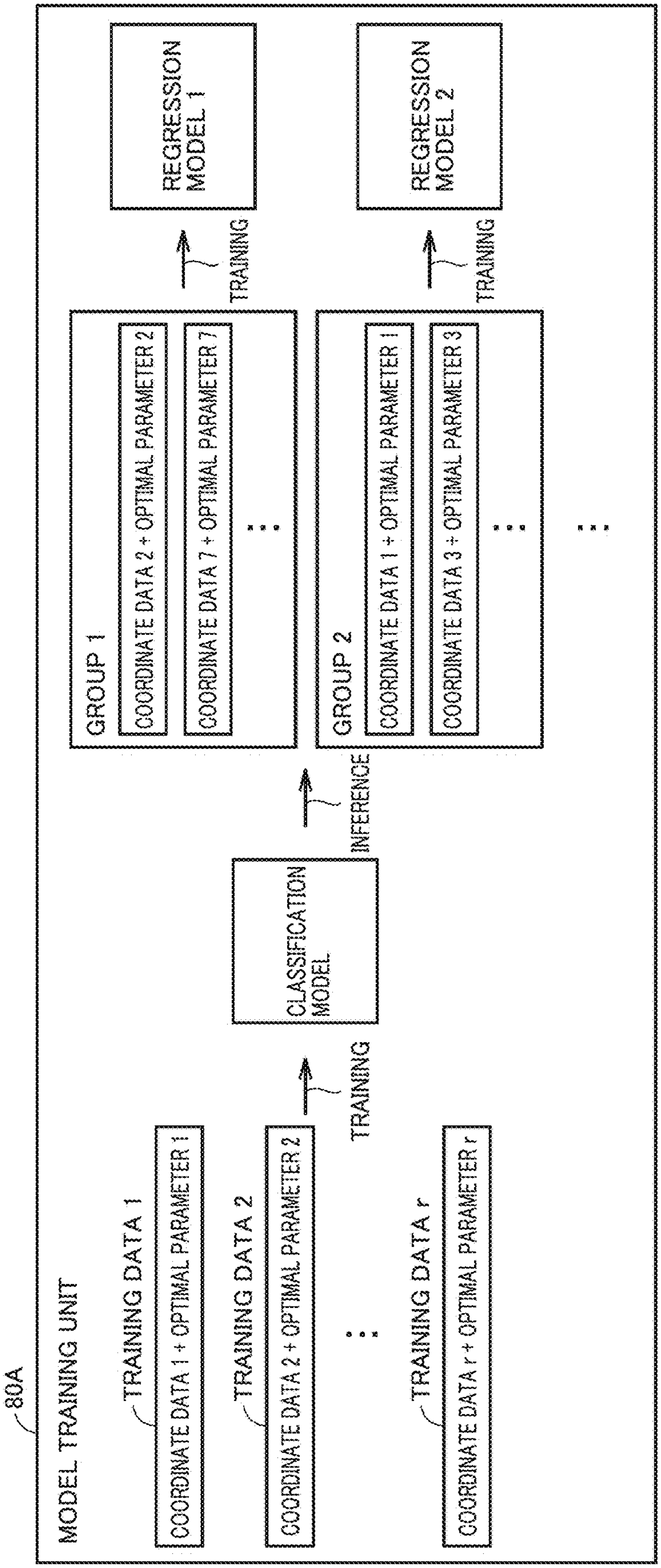
FIG. 12 is a diagram (part 2) schematically showing an example of training by the model training unit.

FIG. 12 schematically shows an example of training performed by a model training unit 80A according to a second modification. As illustrated in FIG. 12, model training unit 80A according to the second modification generates a classification model and a plurality of regression models as a trained model. The classification model is, for example, a model for clustering, which is a classification method of unsupervised machine learning. The plurality of regression models are each a general machine-learnt regression model such as a multiple regression model.

As illustrated in FIG. 12, model training unit 80A uses r pieces of coordinate data in the training data to train a classification model for classifying the r pieces of training data into a plurality of groups. A criterion for the classification model to group the coordinate data is, for example, a distance between start point coordinates and end point coordinates. In that case, the classification model is generated, for example, to classify the coordinate data into two groups of a group for a long distance and a group for a short distance.

The generated classification model outputs a plurality of groups each composed of at least one or more training data. Therefore, for each of the plurality of groups, a regression model receiving coordinate data as an input and outputting an appropriate parameter is generated.

Such a training method that classifies training data into a plurality of groups can reduce an amount of training for each individual regression model, and hence a period of time required to generate a trained model. For example, when a Gaussian process regression model is adopted as the regression model, an order of an amount of training of a hyperparameter of a kernel function and an order of an amount of calculation of an inverse matrix of a covariance matrix necessary when estimating an appropriate parameter for unknown coordinate data are reduced more as the number of divisions by the classification model increases, and a period of time required for training each regression model can be reduced.

The coordinate data used as an input to the model for training may be converted into a feature vector, as necessary. For example, when industrial machine 2 is a robot having a degree of freedom of three axes composed of an orthogonal coordinate system of an X-axis, a Y-axis, and a Z-axis, and start point coordinates (Xs, Ys, Zs) and end point coordinates (Xg, Yg, Zg) can be set as coordinate data, the coordinate data may be converted into differences (ΔX, ΔY, ΔZ) between the coordinates of the axes.

Figure 13:
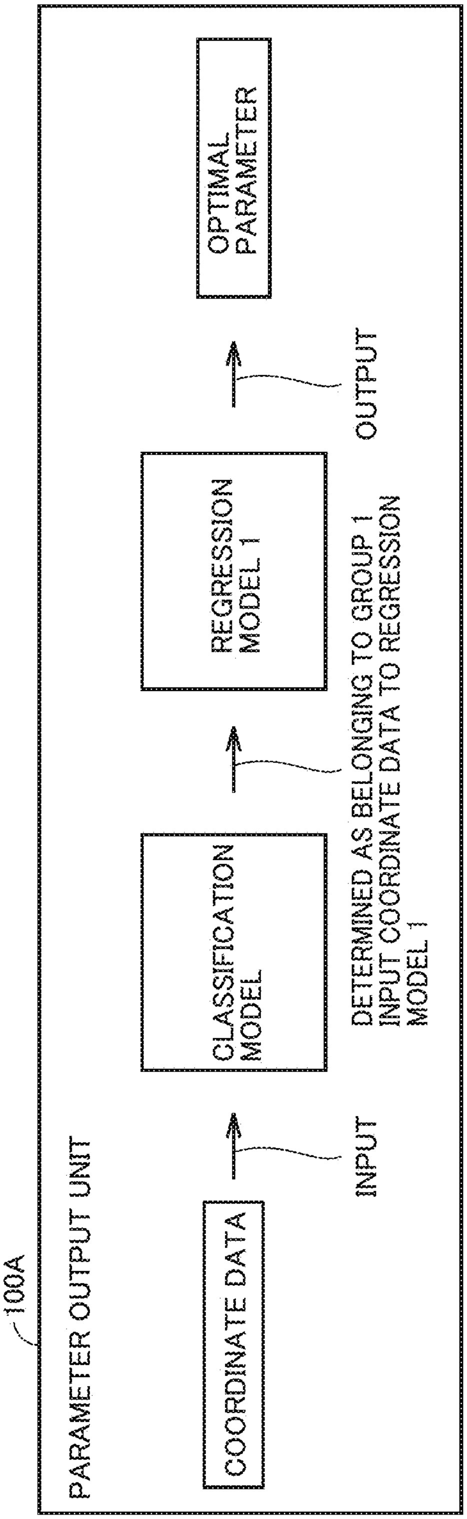
FIG. 13 is a diagram (part 2) of an example of outputting an appropriate parameter.

FIG. 13 shows an example of outputting an appropriate parameter by a parameter output unit 100A according to the second modification. Parameter output unit 100A outputs an appropriate parameter through the trained model illustrated in FIG. 12. Specifically, as illustrated in FIG. 13, parameter output unit 100A inputs coordinate data to the classification model to determine to which group the coordinate data belongs, and the parameter output unit inputs the coordinate data to a regression model corresponding to the determined group to output an appropriate parameter for the coordinates.

As described above, the trained model generated by model training unit 80 is not limited to a single regression model, and may for example be a classification model and a plurality of regression models.

Example Configuration of Industrial Machine 2

Hereinafter will be described an example configuration of industrial machine 2 to which parameter adjustment device 5 (or the information processing device) described above is preferably applied.

Figure 14:
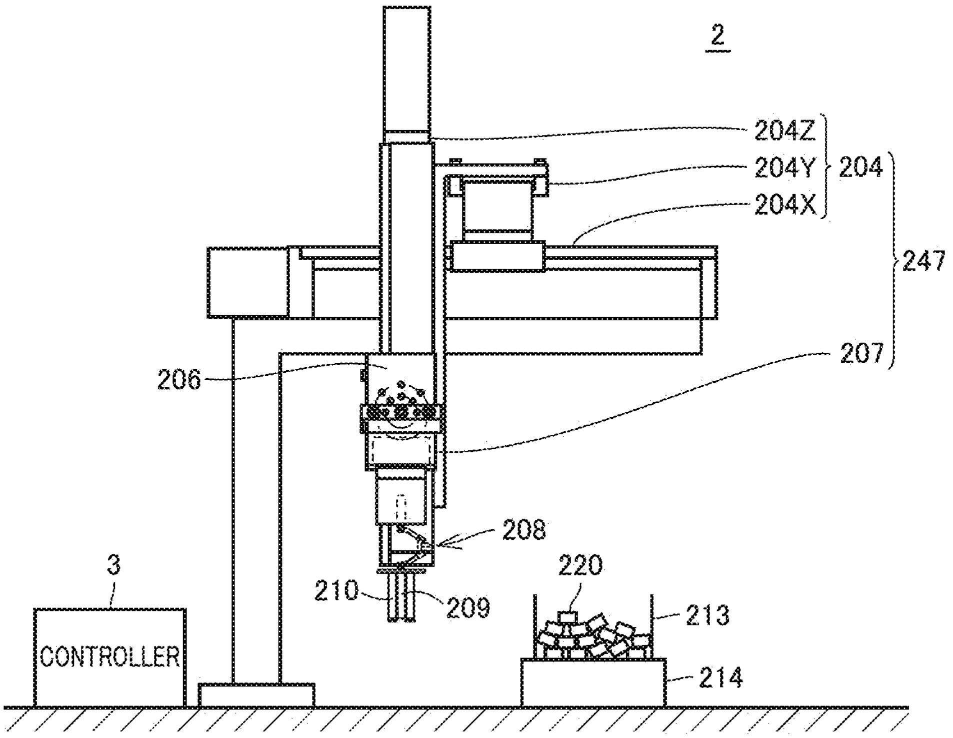
FIG. 14 shows an example of a configuration of an industrial machine.

FIG. 14 shows an example of a configuration of industrial machine 2. Referring to FIG. 14, industrial machine 2 is a pickup device that picks up a workpiece 220 from a site where the workpiece is disposed. Industrial machine 2 can pick up workpiece 220 disposed in any posture on a workpiece setting table 214 or inside a container 213 or the like. Industrial machine 2 comprises an imaging device 209 capable of changing a direction in which workpiece 220 is imaged, and a pickup unit 210 capable of changing a direction in which the pickup unit approaches workpiece 220. Imaging device 209 and pickup unit 210 are controlled by controller 3.

Imaging device 209 captures an image of at least one workpiece 220. Pickup unit 210 approaches workpiece 220 in the direction and picks up workpiece 220. In many cases, workpieces 220 to be picked up are randomly heaped in workpiece container 213 on workpiece setting table 214.

Industrial machine 2 further comprises a positioning mechanism 247 and an angle adjustment device 208. Positioning mechanism 247 is composed of a rotation mechanism 207 and a linear motion unit 204. Imaging device 209 and pickup unit 210 are attached to angle adjustment device 208. Positioning mechanism 247 is configured to be capable of positionally adjusting angle adjustment device 208 relative to workpiece 220. Rotation mechanism 207 has a spatial position changeable by linear motion unit 204 having three orthogonal axes.

Linear motion unit 204 includes a first electric actuator 204X, a second electric actuator 204Y, and a third electric actuator 204Z respectively corresponding to the X axis, the Y axis, and the Z axis orthogonal to one another. Rotation mechanism 207 is attached to an output unit 206 of third electric actuator 204Z.

Angle adjustment device 208 is attached to rotation mechanism 207. Angle adjustment device 208 is rotatable by rotation mechanism 207. Imaging device 209 and pickup unit 210 are attached to a link hub on a distal side of angle adjustment device 208. Angle adjustment device 208 is configured to be capable of adjusting as desired the direction of the optical axis of imaging device 209 and the direction in which pickup unit 210 approaches the workpiece.

Figure 15:
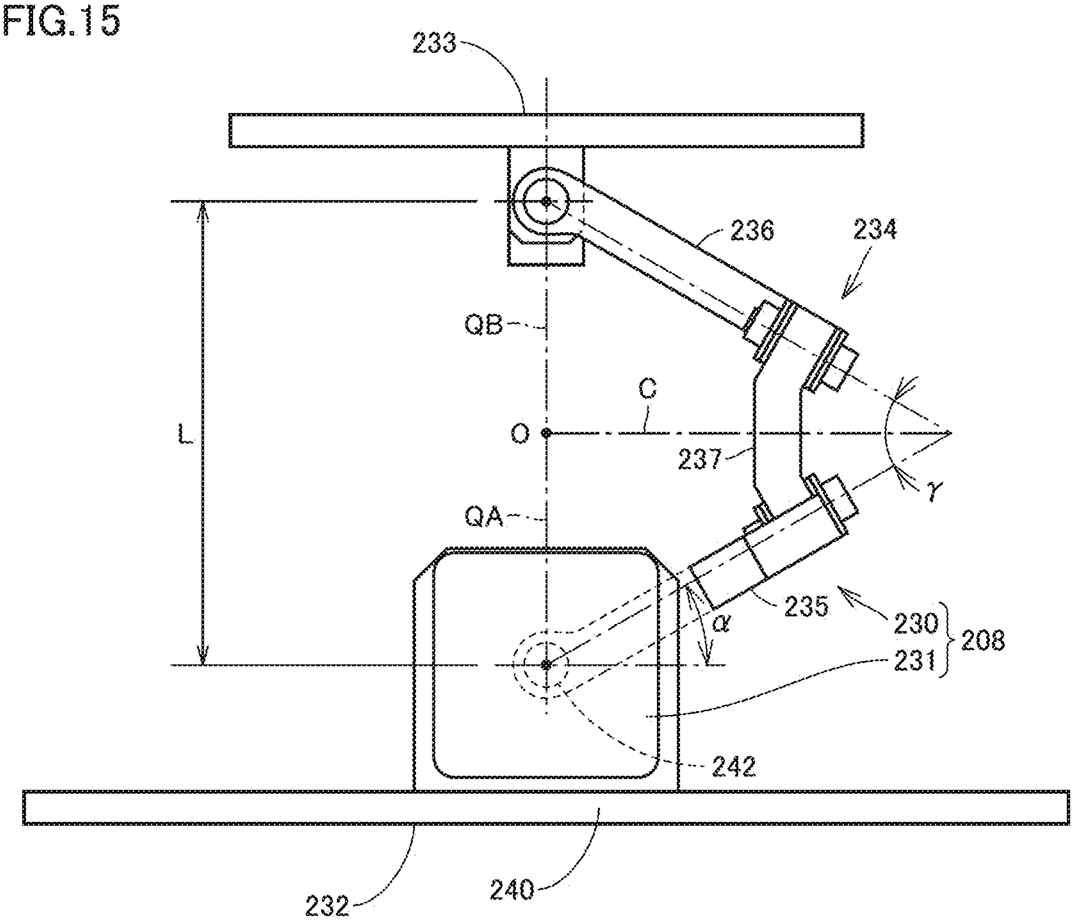
FIG. 15 shows an example of a configuration of an angle adjustment device.
Figure 16:
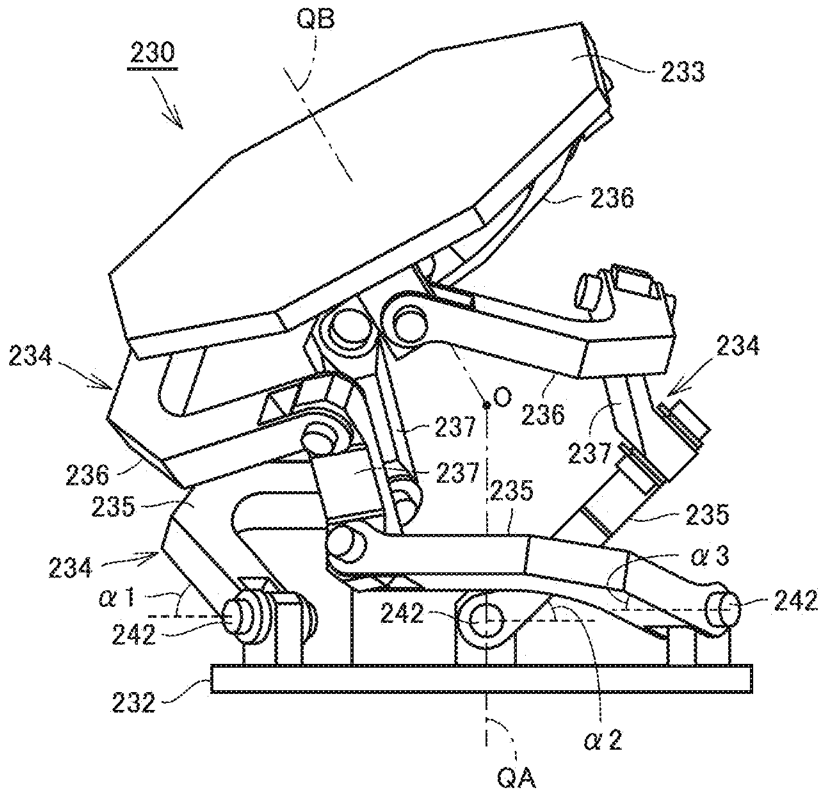
FIG. 16 is a perspective view of an example of a configuration of a parallel link mechanism.

FIG. 15 shows an example of a configuration of angle adjustment device 208. Angle adjustment device 208 shown in FIG. 15 includes a parallel link mechanism 230 and an actuator 231. FIG. 16 is a perspective view of an example of a configuration of parallel link mechanism 230. FIG. 15 representatively extracts and shows one of three link mechanisms 234 shown in FIG. 16.

As shown in FIGS. 15 and 16, industrial machine 2 further comprises a first link hub 232, and a second link hub 233 to which imaging device 209 and pickup unit 210 are attached. Positioning mechanism 247 is configured to be capable of positionally changing first link hub 232. Angle adjustment device 208 couples first link hub 232 and second link hub 233 together.

Angle adjustment device 208 is composed of parallel link mechanism 230 to support and allow imaging device 209 and pickup unit 210 to be changed in posture, and actuator 231 to actuate parallel link mechanism 230 for controlling a posture. Actuator 231 can change an angle $\alpha$ indicated in FIG. 15.

Referring to FIGS. 15 and 16, parallel link mechanism 230 is composed of proximal, first link hub 232, distal, second link hub 233, and three link mechanisms 234 that couple the second link hub to the first link hub such that the second link hub is changeable in posture. Imaging device 209 and pickup unit 210 shown in FIG. 14 are attached to distal, second link hub 233. While parallel link mechanism 230 having three link mechanisms 234 is discussed herein, four or more link mechanisms 234 may be provided.

Each link mechanism 234 is composed of a proximal end link member 235, a distal end link member 236, and a central link member 237. Link mechanism 234 is a four-bar linkage mechanism composed of four revolute pairs of elements. Proximal and distal end link members 235 and 236 are in the form of the letter L.

Proximal end link member 235 has one end rotatably coupled to proximal, first link hub 232. Distal end link member 236 has one end rotatably coupled to distal, second link hub 233. End link members 235 and 236 have their respective other ends rotatably coupled to opposite ends of central link member 237.

Parallel link mechanism 230 has a structure in which two spherical link mechanisms are combined together. The revolute pair of end link member 235 and central link member 237 and that of end link member 236 and the central link member may have their respective central axes forming a crossing angle $\gamma$ (see FIG. 15) or in parallel.

Figure 17:
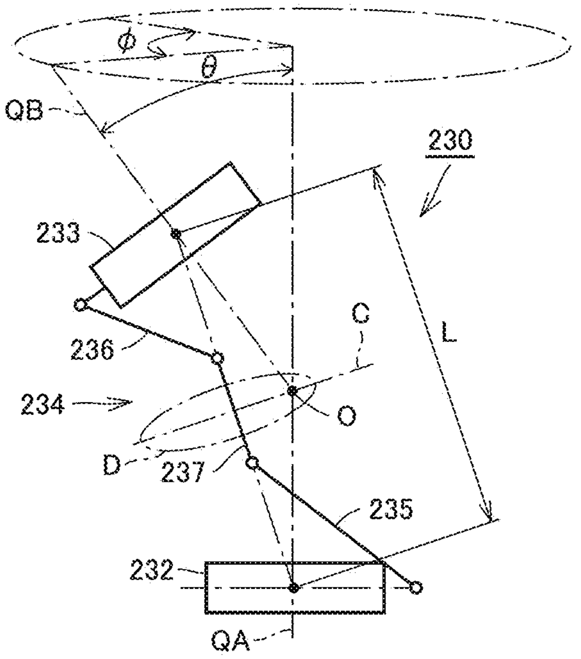
FIG. 17 is a diagram representing one link mechanism by straight lines.

FIG. 17 is a diagram representing one link mechanism 234 by straight lines. The three link mechanisms 234 can be represented in a geometrically identically shaped model.

Proximal, first link hub 232, distal, second link hub 233, and the three link mechanisms 234 constitute a mechanism of two degrees of freedom. In this mechanism of two degrees of freedom, distal, second link hub 233 has two degrees of freedom rotatable about two orthogonal axes relative to proximal, first link hub 232. These two orthogonal axes are an axis of rotation for a turning angle $\varphi$ (i.e., a central axis QA) and an axis of rotation for a bending angle $\theta$ (an axis passing through a point O and orthogonal to center axis QA and a central axis QB) shown in FIG. 17. Turning angle $\varphi$ is an angle formed in a plane perpendicular to central axis QA of first link hub 232 by a reference straight line passing through an intersection point of central axis QA and a straight line projecting central axis QB of second link hub 233. Bending angle $\theta$ is an angle formed by central axis QA of first link hub 232 and central axis QB of second link hub 233. This mechanism of two degrees of freedom is compact and yet allows distal, second link hub 233 to be movable relative to proximal, first link hub 232 in a large range.

Bending angle $\theta$ can be adjusted simply by operating link mechanism 234 and does not involve an operation of a plurality of joints as in an articulated robot. Thus, parallel link mechanism 230 can operate faster than the articulated robot. When using the FIG. 16 parallel link mechanism 230 to collect image data necessary for machine learning is compared with an articulated robot, the former allows image data to be collected in a larger amount in a shorter period of time.

Posture controlling actuator 231 of angle adjustment device 208 shown in FIG. 15 is a rotary actuator including a speed reduction mechanism. Actuator 231 is disposed on a surface of a proximal end member 240 of first link hub 232 to be coaxial with an axis of rotation 242. Actuator 231 and the speed reduction mechanism are integrally provided, and the speed reduction mechanism is fixed to proximal end member 240. While the three link mechanisms 234 may be provided with three posture controlling actuators 231 for changing angles α1 to α3 indicated in FIG. 16, the three actuators 231 may not necessarily be provided. Providing at least two of the three link mechanisms 234 with posture controlling actuator 231 allows a posture of distal, second link hub 233 to be determined with respect to proximal, first link hub 232.

Parameter adjustment device 5 (or the information processing device) described above is suitably applied to control positioning a multiaxial robot such as industrial machine 2 shown in FIGS. 14 to 17.

It should be understood that the embodiments disclosed herein are illustrative and non-restrictive in any respect. The scope of the present disclosure is defined by the terms of the claims rather than by the foregoing description of the embodiments and is intended to encompass any modification within the meaning and scope equivalent to the terms of the claims.

REFERENCE SIGNS LIST

1 control system, 2 industrial machine, 3 controller, 4 sensor, 5, 5A, 5B parameter adjustment device, 10 coordinate data acquisition unit, 20 parameter generation unit, 30 parameter storage unit, 40 state data acquisition unit, 50 index data calculation unit, 60 sample storage unit, 70 parameter search unit, 71 searching model construction unit, 72 searching model storage unit, 73 parameter estimation unit, 80, 80A model training unit, 90 model storage unit, 100, 100A parameter output unit, 204 linear motion unit, 204X first electric actuator, 204Y second electric actuator, 204Z third electric actuator, 206 output unit, 207 rotation mechanism, 208 angle adjustment device, 209 imaging device, 210 pickup unit, 213 container, 214 workpiece setting table, 220 workpiece, 230 parallel link mechanism, 231 actuator, 232 first link hub, 233 second link hub, 234 link mechanism, 235, 236 end link member, 237 central link member, 240 proximal end member, 242 axis of rotation, 247 positioning mechanism.

The invention claimed is:

1. An information processing device for a drive device controlled by a controller, comprising:

a coordinate data acquisition unit that externally acquires coordinate data representing operation coordinates of the drive device;

a parameter generation unit that generates an operation parameter;

a parameter storage unit that stores the operation parameter and outputs to the controller an operate command including the operation parameter;

a state data acquisition unit that acquires state data representing a state of the drive device while the drive device operates in accordance with the operation parameter;

an index data calculation unit that calculates index data based on the state data of the drive device acquired during operation of the drive device in accordance with the operation parameter;

a sample storage unit that stores sample data in which the operation parameter generated by the parameter generation unit is associated with the index data calculated from the state data acquired during operation of the drive device in accordance with the operation parameter;

a parameter search unit that estimates a candidate operation parameter based on the sample data and determines whether the candidate operation parameter is appropriate for performing an operation for the coordinate data based on the index data;

a model training unit that uses training data in which the candidate operation parameter is determined to be appropriate is associated with the coordinate data to generate a trained model for estimating from the coordinate data an appropriate parameter which is an operation parameter suitable for performing an operation for the coordinate data;

a model storage unit that stores the trained model generated by the model training unit; and a parameter output unit that outputs the appropriate parameter to the controller by inputting the coordinate data acquired by the coordinate data acquisition unit to the trained model stored in the model storage unit, wherein the controller controls the drive device in accordance with the appropriate parameter output by the parameter output unit.

2. The information processing device according to claim 1, wherein the parameter search unit instructs the controller to control the drive device with the candidate operation parameter determined to be appropriate, the state data acquisition unit acquires search state data representing a state of the drive device when the drive device is operated with the candidate operation parameter determined to be appropriate, the index data calculation unit calculates the index data based on the search state data, the sample storage unit stores, as the training data, data in which an operation parameter determined to be appropriate based on the search state data is associated with the coordinate data, and the model training unit uses the training data stored in the sample storage unit to generate the trained model.

3. The information processing device according to claim 1, wherein the state data acquisition unit acquires search state data representing a state of the drive device when the drive device is operated with the candidate operation parameter determined to be appropriate, the index data calculation unit calculates two or more types of indices based on the search state data and sets a combination of the calculated two or more types of indices as the index data, and the parameter search unit uses a multi-objective optimization method to estimate an operation parameter determined to be appropriate based on each index constituting the index data.

4. The information processing device according to claim 1, wherein the parameter generation unit generates a first predetermined number of operation parameters set depending on a parameter search method of the parameter search unit.

5. The information processing device according to claim 1, wherein when a second predetermined number of training data set depending on a model training method of the model training unit is stored in the sample storage unit, the model training unit uses the second predetermined number of training data to generate the trained model.

6. The information processing device according to claim 1, wherein the parameter search unit includes:

a searching model construction unit that uses the sample data stored in the sample storage unit to generate a searching model for estimating the index data from the operation parameter;

a searching model storage unit that stores the searching model; and a parameter estimation unit that searches for an operation parameter estimated to be appropriate based on the index data estimated through the searching model.

7. The information processing device according to claim 1, wherein the state data acquisition unit acquires torque data from the drive device, and the index data calculation unit sets a linear combination of a value in amplitude of vibration of torque calculated from the torque data and an attenuation rate in waveform of the torque as an index indicating residual vibration after the drive device is positioned.

8. The information processing device according to claim 1, wherein the model training unit generates a classification model that divides training data stored in the sample storage unit into a plurality of groups, and the model training unit generates a plurality of regression models that are respectively provided for the plurality of groups.

* * * * *